No. 649,837. Patented May 15, 1900.
G. W. HARDIN.
HITCHING DEVICE.
(Application filed Feb. 9, 1900.)
(No Model.)
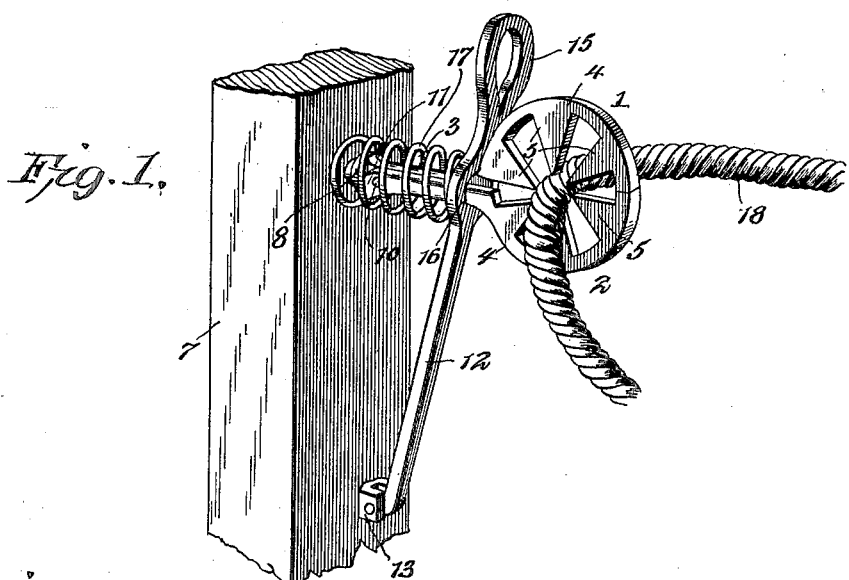
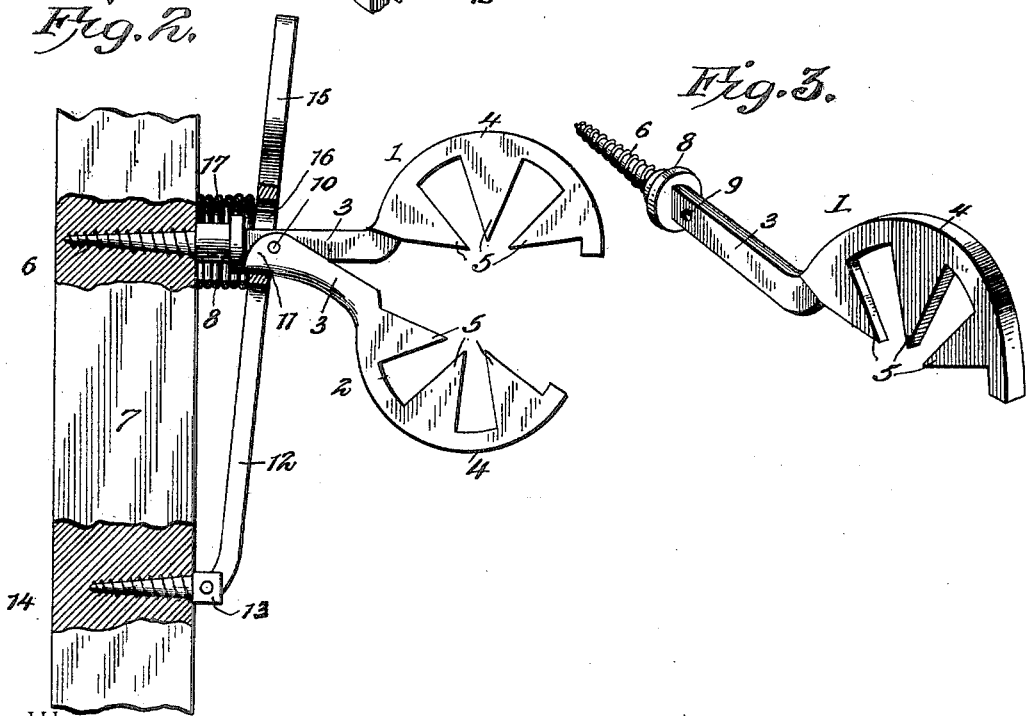
Witnesses
Howard D. Orr.
O. F. Shepard.
By his Attorneys,
C. A. Snow & Co.
G. W. Hardin, Inventor.
THE NORRIS PETERS CO., PHOTO-LITHO., WASHINGTON, D. C.

UNITED STATES PATENT OFFICE.

GEORGE W. HARDIN, OF CHOKIO, MINNESOTA.

HITCHING DEVICE.

SPECIFICATION forming part of Letters Patent No. 649,837, dated May 15, 1900.

Application filed February 9, 1900. Serial No. 4,689. (No model.)

*To all whom it may concern:*

Be it known that I, GEORGE W. HARDIN, a citizen of the United States, residing at Chokio, in the county of Stevens and State of Minnesota, have invented a new and useful Hitching Device, of which the following is a specification.

This invention relates to hitching-posts, and has for its object to provide an improved hitching attachment which is applicable to stalls as well as to hitching-posts and is designed to firmly secure a hitching-strap or rope without necessitating the tying of the latter. It is furthermore designed to provide means for operating the device so as to facilitate the application of a hitching-strap thereto and to firmly lock the device against accidentally releasing the strap by a movement of the horse, and finally to insure a convenient and positive releasing of the strap when the device is properly operated.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a hitching attachment constructed in accordance with the present invention. Fig. 2 is a sectional elevation thereof in open position to receive a hitching-strap. Fig. 3 is a detail perspective view of one of the members of the device.

Corresponding parts in the several figures of the drawings are designated by like characters of reference.

Referring to the drawings, it will be seen that the device comprises a fixed jaw or member 1 and a movable member 2, each of which comprises a substantially-straight shank or stem 3 and a segmental jaw 4, having an inner series of radial teeth 5, which are designed to coöperate to bind upon the hitching-strap or rope. The fixed member has the outer extremity of its stem screw-threaded, as indicated at 6, so that it may be conveniently and firmly connected to a post or other support 7. Intermediate of the threaded and unthreaded portions of the stem is an annular shoulder or collar 8, and immediately in advance of this collar is a perforation 9, for the reception of a suitable pivot-pin 10, whereby the members are pivotally or hingedly connected. The extremity of the stem of the movable member is rounded and enlarged laterally, so as to form a cam 11, which is eccentrically mounted upon the pivot-pin 10, for a purpose as will be hereinafter set forth.

The means for operating the movable member comprises an upright lever 12, which has its lower end fulcrumed upon a substantially U-shaped clip or bracket 13, that is provided with a screw-threaded stem 14 to secure the bracket to the support 7 at a suitable distance below the members of the device. The upper end of the lever extends above the clamp members and is provided with a suitable handle 15, and intermediate of the handle there is provided a slot or opening 16 to slidably receive the combined stems of the clamp members. Embracing the stems of the clamp members is a coiled spring 17, which bears in opposite directions against the adjacent side of the post and the inner side of the lever, so as to normally force the latter toward the jaws of the clamp members, and thereby normally hold said jaws in closed position. It will now be apparent that the walls of the slot or opening in the lever form a sleeve to slidably embrace the combined stems of the clamp members, so as to control the operation thereof.

In the operation of the device the lever 12 is forced rearwardly until the sleeve 16 engages the cam end of the stem of the movable member, whereby the latter is opened or moved away from the fixed member, so that a rope or hitching-strap 18 may be entered between the jaws, after which the lever is released, and in resuming its normal position under the influence of the spring the sleeve draws the members together, so as to firmly clamp upon the rope or strap. In this position of the device the lever rests against the rear end of the jaw of the fixed member, so as to be limited in its outward movement, and thus hold the members against accidental separation by a movement of the animal or otherwise. When the device is open, the rounded rear end of the stem of the movable member engages the shoulder or collar 8 upon the fixed member, so as to limit the downward movement of the member, and thereby hold it in position for engagement with the sleeve 16 when the lever is forced forward.

In order that the jaws of the clamp members may lie close together, the inner faces of the stems are flat, as best shown in Fig. 3 of the drawings, and the jaws are thicker than the stems and are offset inwardly, so that the inner edges thereof or the points of the teeth may come together in the closed position of the jaws.

What I claim is—

1. A hitching device, comprising pivotally or hingedly connected hitch-strap-engaging members, and a spring-actuated lever, fulcrumed at one of its ends, and having a handle at its opposite end, and an intermediate sleeve slidably embracing the members.

2. A hitching device, comprising pivotally or hingedly connected members, one of which is provided with a cam-face, and a sleeve slidably embracing the members, and for engagement with the cam-face to open the members.

3. In a hitching device, pivotally or hingedly connected members, one of which is formed for application to a support, a lever, having a sleeve slidably embracing the members, and a fulcrum-bracket for the lever, said bracket having means for attachment to the support.

4. A hitching device, comprising clamping members, each of which has a jaw and a stem, one of the latter having a cam portion, which is eccentrically pivoted to the other stem, and a sleeve slidably embracing the combined stems, and for engagement with the cam.

5. A hitching device comprising a fixed member, having a stem, which is provided with a shoulder, a movable member, having a stem, which is provided with a cam-shaped extremity having a pivotal connection with the stem of the other member and adjacent to the shoulder thereof, and adapted for engagement with said shoulder, in the open position of the member, and a sleeve slidably embracing the combined stems, and for engagement with the cam-shaped extremity of one of the stems.

6. In a hitching device, the combination with a support, of a fixed hitch-strap-engaging member, having a stem connected to the support, a movable hitch-strap-engaging member, having a stem pivotally or hingedly connected to the stem of the other member, a lever fulcrumed upon the support, and having a sleeve slidably receiving the combined stems of the members, and a coiled spring embracing the stems and bearing in opposite directions against the support and the lever.

In testimony that I claim the foregoing as my own I have hereto affixed my signature in the presence of two witnesses.

GEORGE W. HARDIN.

Witnesses:
GEO. DOPKINS,
WILLIAM ROSS.